(12) United States Patent
Roberts et al.

(10) Patent No.: US 8,068,740 B1
(45) Date of Patent: Nov. 29, 2011

(54) SECURE OPTICAL COMMUNICATION SYSTEM

(75) Inventors: Mark W. Roberts, San Diego, CA (US); Markham E. Lasher, La Jolla, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 713 days.

(21) Appl. No.: 12/182,106

(22) Filed: Jul. 29, 2008

(51) Int. Cl.
*H04B 10/00* (2006.01)
*H04B 10/04* (2006.01)

(52) U.S. Cl. ........ 398/140; 398/141; 398/152; 398/183; 398/39; 380/255; 380/256

(58) Field of Classification Search .................. 398/140, 398/152, 183, 39, 40, 141, 151, 44; 380/256, 380/255, 44
See application file for complete search history.

(56) References Cited

U.S. PATENT DOCUMENTS

| | | | | |
|---|---|---|---|---|
| 5,418,905 A | * | 5/1995 | Rarity et al. | 398/40 |
| 5,600,126 A | * | 2/1997 | Appel et al. | 250/205 |
| 2004/0208638 A1 | * | 10/2004 | Jansen | 398/183 |
| 2006/0263096 A1 | | 11/2006 | Dinu et al. | |
| 2007/0230688 A1 | | 10/2007 | Tajima et al. | |

* cited by examiner

*Primary Examiner* — M. R. Sedighian
(74) *Attorney, Agent, or Firm* — Kyle Eppele; J. Eric Anderson

(57) ABSTRACT

In various embodiments, a secure optical communication system is disclosed. Such a system may include a photon-pair generation circuit configured to generate pairs of photons with each photon pair including a first-channel photon and a second-channel photon, a transmitting circuit configured to receive first-channel photons, and modulate the first-channel photons according to a stream of data using a first optical circulator to produce first-modulated photons, and a receiving circuit configured to receive second-channel photons, pass the second-channel photons through a complementary optical circulator to produce second modulated photons, and detect relative timing between the first-modulated photons and the second modulated photons to recover the stream of data.

18 Claims, 7 Drawing Sheets

Probability for simultaneous outputs from OC1 and OC2:

$$p_{m,m} = p_{0,0} + p_{1,1} + p_{2,2} + p_{3,3} + \ldots$$

$$p_{m,m} = [(ir_1)(ir_2)] + [(-it_1^2)(-it_2^2)] + [(-it_1^2 r_1)(-it_2^2 r_2)] + [(-it_1^2 r_1)(-it_2^2 r_2)] + \ldots$$

using: $1 + x + x^2 + x^3 + \ldots = \dfrac{1}{1-x}$ , $(0 \leq x < 1)$ $$p_{m,m} = -[r_1 r_2] - [t_1^2 t_2^2 / (1 - r_1 r_2)]$$

with: $r_1 = r_2 = r$ , $t_1 = t_2 = t$ $$p_{m,m} = -[r^2] - [t^4 / (1 - r^2)] = -[r^2 + t^2] = -1$$

$$\therefore P_{m,m} = |p_{m,m}|^2 = |-1|^2 = 1$$

FIG. 5

Probability for no simultaneous outputs from OC1 and OC2:

$p_{m,m} = P_{0,0} + P_{1,1} + P_{2,2} + P_{3,3} + P_{4,4} + \ldots$ $p_{m,m} = -r^2 + t^4 - t^4 r^2 + t^4 r^4 - t^4 r^6 + \ldots$ using: $1 + x + x^2 + x^3 + \ldots = \dfrac{1}{1-x}$ , $(0 \leq x < 1)$ $p_{m,m} = -[r^2] + [t^4/(1-r^4)] - [t^4 r^2/(1-r^4)]$ with: $r = \sqrt{1/3}$ , $t = \sqrt{2/3}$ , $(R = 1/3$ , $T = 2/3)$ $p_{m,m} = -(1/3) + (1/2) - (1/6) = 0$ $\therefore P_{m,m} = |p_{m,m}|^2 = |0|^2 = 0$

FIG. 6

SECURE OPTICAL COMMUNICATION SYSTEM

FEDERALLY-SPONSORED RESEARCH-AND DEVELOPMENT

This invention (Navy Case No. 98770) was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2 @spawar.navy.mil.

BACKGROUND

1. Field

This disclosure relates to secure optical communications systems.

2. Background

Secure communication systems are a cornerstone of government, business and military interests. Generally, secure communications are established by applying an encryption to a given message to produce an encrypted message, transmitting the encrypted message to a remote location, and decrypting the encrypted message at the remote location.

Unfortunately, the encryption and decryption processes can be computationally expensive, and they are by no means absolutely secure. Further, increasing the level of encryption involves increasing the level of computation and decreasing data transmission efficiency.

Regardless of whatever level of encryption may be used, a threat to the security of any transmitted information may be posed by the possible construction of a quantum computer. If such a computer is eventually constructed, then a known algorithm may be run on such a computer that will enable the computer to "break" virtually every modern data encryption technique in a very short time. Thus, new technology directed to secure data communications may be desirable.

SUMMARY

Various aspects and embodiments of the invention are described in further detail below.

In a first series of embodiments, a secure optical communication system includes a photon-pair generation circuit configured to generate pairs of photons with each photon pair including a first-channel photon and a second-channel photon, a transmitting circuit configured to receive first-channel photons, and modulate the first-channel photons according to a stream of data using a first optical circulator to produce first-modulated photons, and a receiving circuit configured to receive second-channel photons, pass the second-channel photons through a complementary optical circulator to produce second modulated photons, and detect relative timing between the first-modulated photons and the second modulated photons to recover the stream of data.

In other embodiments, a secure optical communication system includes a photon-pair generation means for generating pairs of photons with each photon pair including a first-channel photon and a second-channel photon, a transmitting means for modulating first-channel photons according to a stream of data to produce first-modulated photons, and a receiving means for processing second-channel photons to produce second-processed photons, and detecting relative timing between the first-modulated photons and the second-processed photons to recover the stream of data.

BRIEF DESCRIPTION OF THE DRAWINGS

The features and nature of the present disclosure will become more apparent from the detailed description set forth below when taken in conjunction with the accompanying drawings in which reference characters identify corresponding items.

FIG. 5 presents calculations for simultaneous outputs from two circulators.

FIG. 6 presents calculations for no simultaneous outputs from two circulators.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
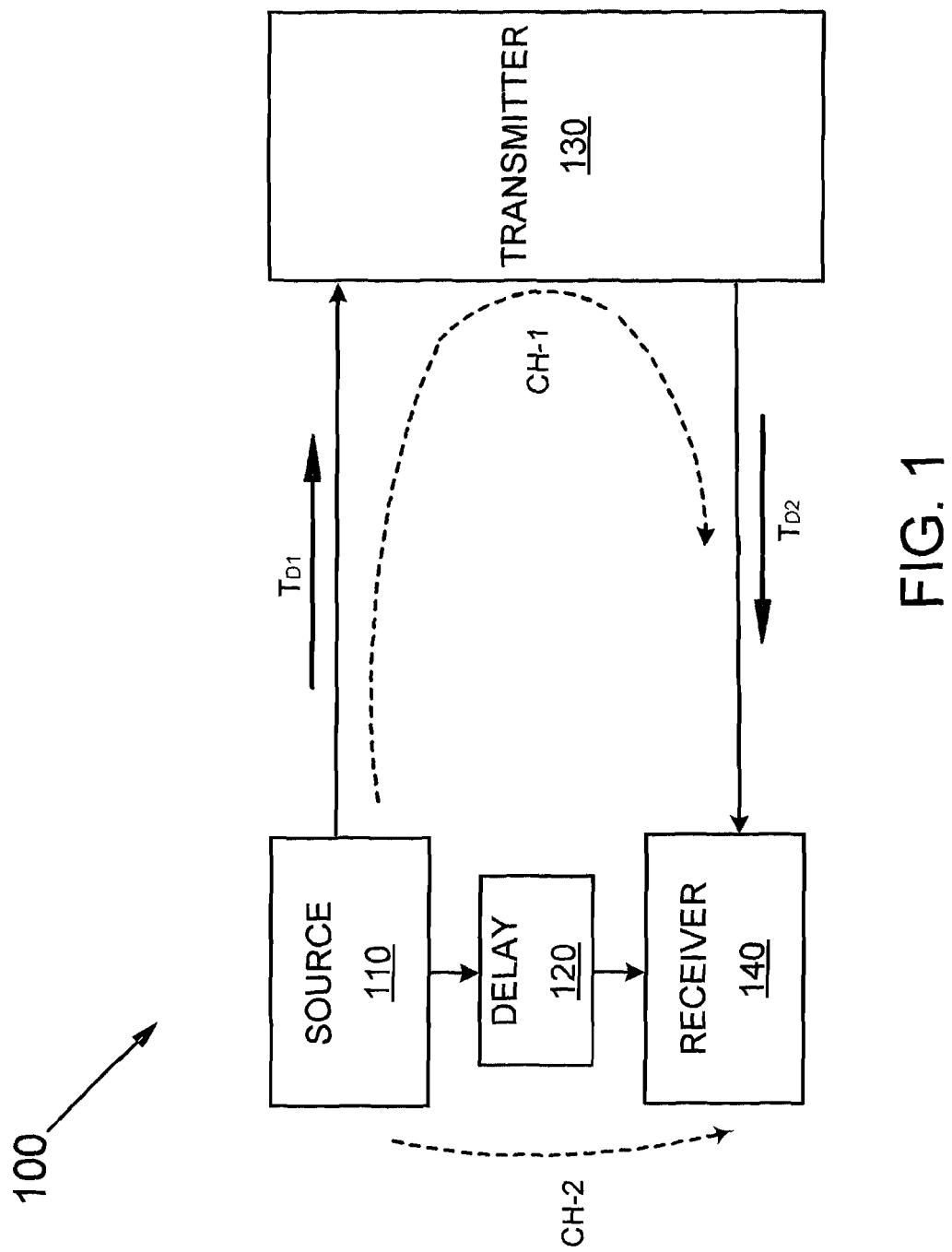
FIG. 1 is a system view of an exemplary secure communication system.

FIG. 1 is a system view of an exemplary secure communication system 100. As shown in FIG. 1, the exemplary communication system 100 includes a photon source 110, a photon delay 120, a transmitter 130 and a receiver 140. The various devices 110-140 may be coupled together via any number of optical conduits.

In operation, the photon source 110 can generate pairs of photons with each photon pair including a first-channel photon and a second-channel photon. Photons travelling to the transmitter can be referred to as the first-channel (CH-1) photons while photons travelling to the receiver 140 may be referred to as the second-channel (CH-2) photons.

During operation, the transmitter 130 may be configured to receive first-channel photons, and modulate the first-channel photons according to a stream of data to produce first-modulated photons, which may then be sent to receiver 140. Meanwhile, the receiver 140 may be configured to receive second-channel photons (via delay 120), process the second-channel photons to produce second-processed photons, and subsequently detect the relative timing between the first-modulated photons and the second-processed photons to recover the stream of data.

Note that in various embodiments, the photon source 110, delay 120, and receiver 140 may be co-located, and the delay 120 constructed to cause a time delay of photons approximately equal to the sum of the relative delays $T_{D1}$ and $T_{D2}$ to/from the transmitter 130. Assuming that inherent delays of the transmitter 130 and receiver 140 (relative to photon source 110) are about the same, first and second-channel photons may enter certain detection circuitry within the receiver 140 at about the same time as will be explained below. Generally, delay 120 may include any form of optical delay, such as a spool of optical fiber, and as optical delays are well known in the relevant arts, no further discussion is provided below.

Figure 2:
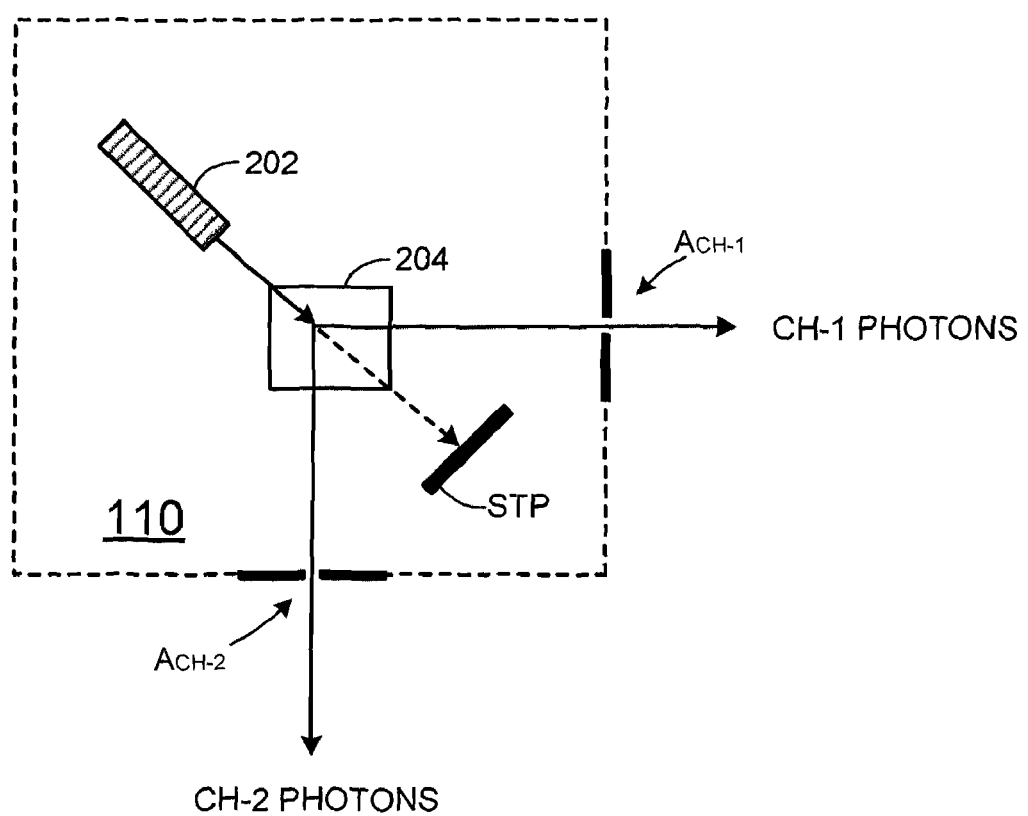
FIG. 2 depicts an exemplary optical source for use in the system of FIG. 1.

FIG. 2 depicts an exemplary photon source 110 for use in the system of FIG. 1. As shown in FIG. 2, the exemplary photon source 110 includes a light energy source 202, e.g., a monochromatic continuous-wave laser having a predetermined wavelength and power spectral density, a photon pair generating device 204, e.g., a non-linear crystal (NLC), a beam stop (STP) and apertures $A_{CH-1}$ and $A_{CH-2}$.

In operation, photons of a particular wavelength ("pump" photons) may be emitted from light energy source 202 toward the photon pair generating device 204. Such pump photons may be annihilated in the photon pair generating device 204 to simultaneously produce via the process of parametric down-conversion photon pairs including the above-mentioned first-channel photons (alternately referred to as "signal" photons) and second-channel photons (alternately referred to as "idler" photons).

When a continuous-wave laser is used as a light energy source, the down-conversion events generating photon pairs can occur essentially at random. Any pump photons not annihilated may be discarded into the beam stop STP. The average rate of photon production may be designated by "Rp" and the average interval between photon pairs may be signified by 1/Rp.

When a non-linear crystal is used to generate photon pairs, such a non-linear crystal may use vertically-polarized pump photons to produce horizontally-polarized first and second-channel photons using a degenerate, noncolinear type I phase-matching process.

Continuing, apertures $A_{CH-1}$ and $A_{CH-2}$ may be placed in the first and second-channel paths, respectively, such that complementary first and second-channel photons exit the source 110 simultaneously. Apertures $A_{CH-1}$ and $A_{CH-2}$ may be placed in a manner so as to transfer only photons having approximately the same center wavelength and bandwidth.

Figure 3:
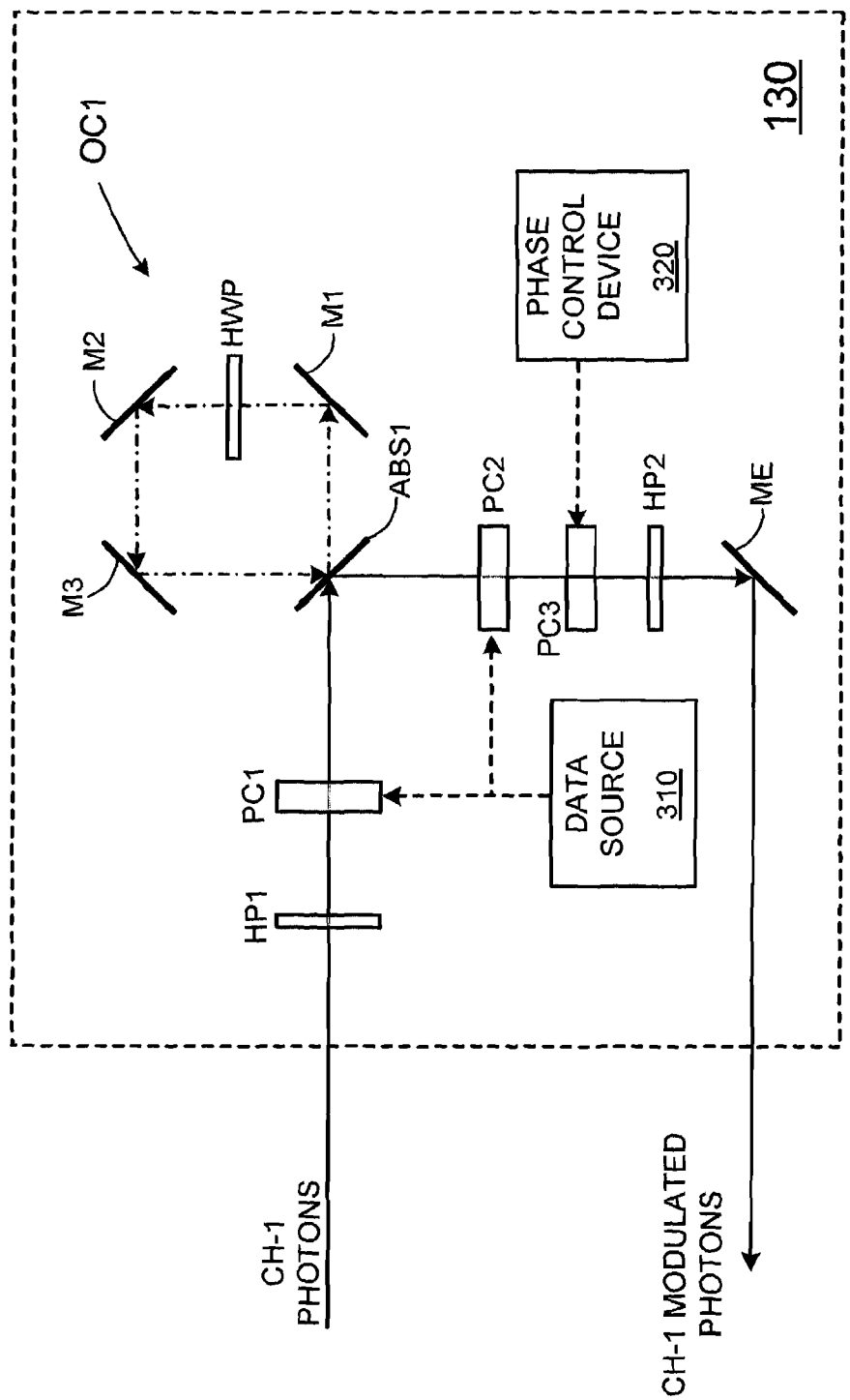
FIG. 3 depicts an exemplary optical transmitter for use in the system of FIG. 1.

FIG. 3 depicts an exemplary optical transmitter 130 for use in the system of FIG. 1. As shown in FIG. 3, the exemplary optical transmitter 130 includes horizontal polarizer plates HP1 and HP2, mirror $M_E$, Pockels cells PC1, PC2 and PC3, a data source 310, a phase control device 320, and an optical circulator OC1 consisting of three mirrors M1-M3 and a beam splitter ABS1 having a first reflection coefficient R1. The mirrors M1-M3 and beam splitter ABS1 may be configured to form an internal path having a length of distance D1. Optical circulator OC1 also includes a half-wave plate HWP inserted within its internal path. The exemplary beam-splitter ABS1 may be set to a reflectance of ⅓ (and thus a transmittance of ⅔) but of course in various embodiments reflectance and transmittance may alternatively vary to any probability greater than zero and less than one. The exemplary half-wave-plate HWP can be set such that its fast axis is set in the horizontal direction and its slow axis set in the vertical direction.

In operation, as first-channel photons are received at horizontal polarizer HP1, horizontal polarizer HP1 can act as a filter, and filtered (only horizontally polarized) photons may be provided to Pockels cell PC1 where they may be effectively modulated. When Pockels cell PC1 is "on", horizontally polarized photons enter and exit as vertically polarized photons; otherwise, when Pockels cell PC1 is "off", horizontally polarized photons enter and exit as horizontally polarized photons.

Pockels cells PC1 and PC2 may act as a switching device modulating a stream of data in response to commands from the data source 310. In the present configuration, Pockels cell PC1 and PC2 each have at least two states with a first "on" state causing first-channel photons to change polarization by π/2 radians when passing through (i.e., it can act as a half-wave plate) while the second "off" state may allow first-channel photons to pass through substantially unaffected. Note that Pockels cells PC1 and PC2 are switched together and thus are both on or both off. Accordingly, when Pockels cell PC1 is off to produce horizontally-polarized photons, Pockels cell PC2 will also be off to allow incident horizontally-polarized photons to remain horizontally-polarized.

Note that as horizontally-polarized photons exit from Pockels cell PC1 (assuming that PC1 and PC2 are off) and are incident on beam-splitter ABS1, ⅓ of such photons may likely be immediately reflected while ⅔ may likely enter optical circulator OC1. For those horizontally-polarized photons entering optical circulator OC1, the half-wave plate HWP will have no effect on the phase of any horizontally-polarized photon traveling along the internal path through optical circulator OC1. Photons later exiting optical circulator OC1 may then reach Pockels cell PC2.

Note that as vertically-polarized photons exit from Pockels cell PC1 (assuming that PC1 and PC2 are on) and are incident on beam-splitter ABS1, again ⅓ of such photons may likely be immediately reflected while ⅔ may likely enter optical circulator OC1. For those vertically-polarized photons that enter optical circulator OC1, the half-wave plate HWP will change their phase by it radians every pass through. As the vertically-polarized photons later exit optical circulator OC1 (or are immediately reflected from beam-splitter ABS1), they may be re-oriented from vertically-polarized photons to horizontally-polarized photons by Pockels cell PC2.

After photons exit Pockels cell PC2, such photons will interact with Pockels cell PC3 in a fashion to randomly change phase by 0 to 2n radians when passing through under control of the phase control device 320. This phase change may add additional security to transmitter 130 should part of its physical plant be compromised.

Continuing, photons exiting Pockels cell PC3 may continue through horizontal polarizer HP2 and be reflected out via mirror $M_E$, where they may be later processed, as will be explained below.

Figure 4:
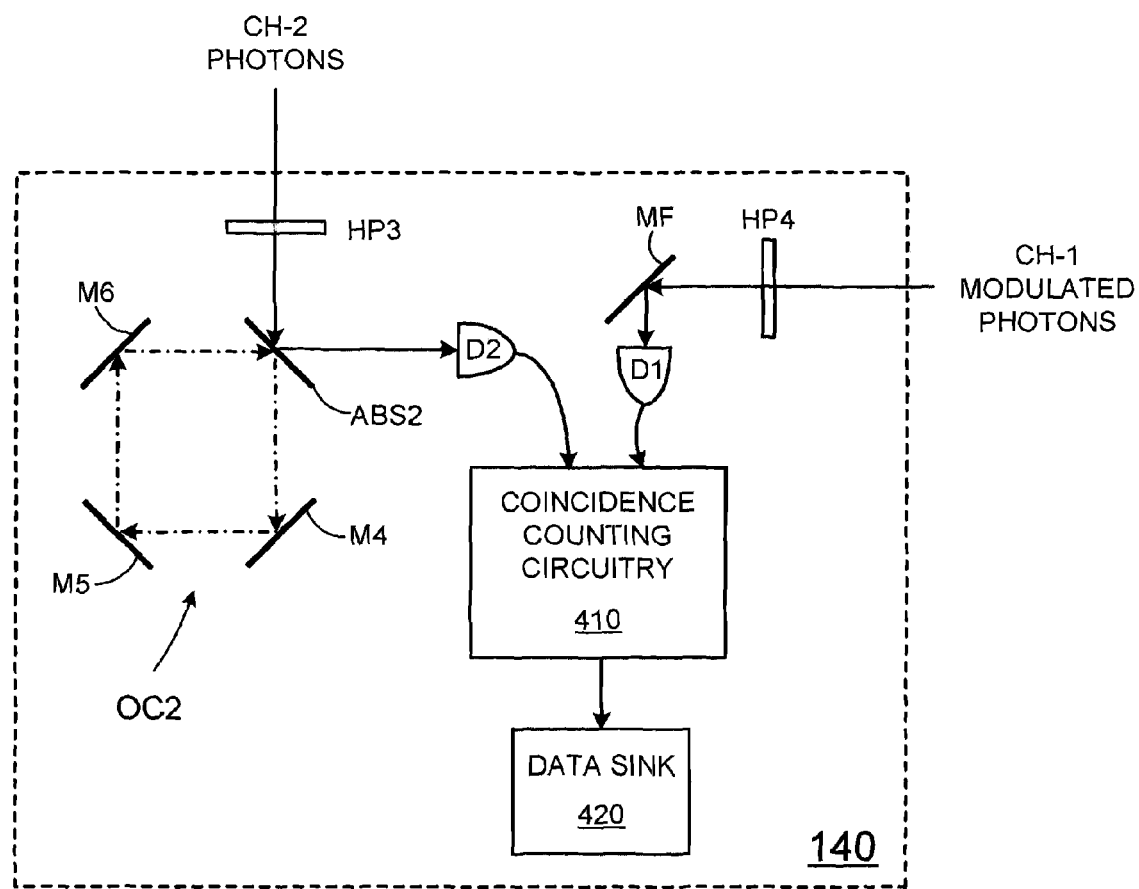
FIG. 4 depicts an exemplary optical receiver for use in the system of FIG. 1.

FIG. 4 depicts an exemplary optical receiver 140 for use in the system of FIG. 1. As shown in FIG. 4, the exemplary optical receiver 140 includes horizontal polarizer plates HP3 and HP4, mirror $M_F$, detector D1 and D2, coincidence circuitry 410, data sink 420, and an optical circulator OC2 consisting of three mirrors M4-M6 and a beam splitter ABS2 having a reflection coefficient R2. The mirrors M4-M6 and beam splitter ABS2 may be configured to form an internal path having a length of distance D2. In various embodiments, reflection coefficient R2 may be close to or the same as the reflection coefficient R1 for the optical circulator OC1 of FIG. 3. Similarly, internal path D2 may be close to or the same as internal path length D1 for the optical circulator OC1 of FIG. 3. When the operational parameters (e.g., R2 and D2) of optical circulator OC2 are the same (or substantially the same) as the operational parameters (e.g., R1 and D1) of optical circulator OC1, then optical circulator OC2 may be said to complement optical circulator OC1.

In operation, as second-channel photons are received at horizontal polarizer HP3, horizontal polarizer HP3 may act as a filter by excluding stray light not horizontally polarized. As filtered photons exit horizontal polarizer HP3, they may be incident on beam-splitter ABS2. Assuming reflection coefficient R2=R1=⅓, then ⅓ of such photons may be immediately reflected while ⅔ may enter optical circulator OC2. Those photons processed by optical circulator OC2, whether they are immediately reflected by beam-splitter ABS2 or enter optical circular OC2 and later exit via beam-splitter ABS2, may be received by detector D2. Detector D2, in turn, may send an appropriate signal to the coincidence circuitry 410 indicating that such second-channel processed photons have been received.

Continuing, first-channel photons that have been modulated by the transmitter 130 of FIG. 3 may be received by horizontal polarizer HP4, and directed to detector D1 via mirror $M_F$. Detector D1, in turn, may send an appropriate signal to the coincidence circuitry 410 indicating that such first-channel modulated photons have been received.

As the modulated/first-channel photons and the processed/second-channel photons are sensed by detectors D1 and D2, the coincidence circuitry 410 may sense the relative timing of each photon of a photon pair to determine whether the photon pair represents a binary "1" or a binary "0" in a number of ways, such as the exemplary process explained further below.

Note that the relative timing of a photon pair may be adjusted by the delay 120 of FIG. 1 such that if Pockels cells PC1 and PC2 are "off", then both channel photons should arrive at detectors D1 and D2 "in coincidence", i.e., within the duration of a common "coincidence time window." Also note that the coherence length of pump photons provided by the light energy source 202 of source 110 must be at least ten times the (single-pass) optical path length through optical circulators OC1 and OC2. Thus, if the path length through optical circulators OC1 and OC2 are one-foot each, the appropriate coherence length of the pump photons can be made a minimum of ten feet.

To explain the mechanisms of the overall communication system, one must appreciate the oddities of quantum mechanics, which Albert Einstein described as "spooky actions at a distance". Quantum mechanical effects are often inexplicable in terms of classical physics. In view of this, one reviewing this disclosure is encouraged to view FIGS. 3 and 4 together.

Binary Zero: To send a binary zero, data source 310 may be assumed to provide an "off" command to Pockels cells PC1 and PC2 (in a stream of data) for a time of duration necessary to send a binary zero message.

In the binary zero case, a first-channel photon reaching optical circulator OC1 will be horizontally polarized. Thus, for instances when such horizontally-polarized photons enter optical circulator OC1, the half-wave plate HWP will have no effect, i.e., optical circulator OC1 can act as if there were no half-wave plate inserted within its internal path. Assuming that the reflectance R2 and internal path length D2 for the receiver's optical circulator OC2 are the same for optical circulator OC1, then the optical circulators OC1 and OC2 tend to operate symmetrically. Therefore, due to "two-photon" interference between each of a first-channel photon and second-channel photon of a photon pair, whatever happens to a first-channel photon at OC1, the same thing will happen to the respective second-channel photon at OC2. The quantum mechanical calculations proving this are presented in FIG. 5. Thus, regardless of relative position of optical circulators OC1 and OC2, if a first-channel photon happens to reflect off beam-splitter ABS1 (and never enters OC1), then the complementary second-channel photon will reflect off beam-splitter ABS2. Similarly, if, for example, a first-channel photon happens to enter OC1 and undergoes three passes within optical circulator OC1 before exiting, then the complementary second-channel photon will enter OC2 and undergo exactly three passes within optical circulator OC2 before exiting, and so on.

Thus, in the off state, any time delay of a first-channel photon caused by optical circulator OC1 will be identical to the delay of a second-channel photon caused by optical circulator OC2. For example, assuming that internal path lengths D1 and D2 are one-foot, then the delay caused by three OC1/OC2 passes of each photon of a photon pair will be the same three nanoseconds. This common delay will be reflected at detectors D1 and D2 of receiver 140, and analyzed by coincidence circuitry 410 to reflect that each photon of a photon pair was received within a coincidence time window. Thus during the time duration of a binary zero, a significant number of coincidence counts will be registered by the coincidence circuitry. Note that a particular coincidence time window may be less than the time it takes for a photon to circulate about optical circulators OC1 and OC2. For example, for a 1 nanosecond pass time for optical circulators OC1 and OC2, it may be appropriate to have a coincidence time window of 0.8 nanoseconds. In response, the appropriate data bit may be transferred from the coincidence circuit 410 to the data sink 420 where the stream of data provided at the transmitter 130 may be recreated.

Note that for each binary bit, the transmitter 130 may need to keep Pockels cells PC1 and PC2 turned off for a duration useful to process a sufficient number of photon pairs such that a statistical analysis of such photon pairs may be applied to ensure accurate data recovery at the receiver 140.

For general reference, FIG. 5 presents calculations for simultaneous outputs from two circulators, such as those shown in FIGS. 3 and 4, while FIG. 6 presents calculations for no simultaneous outputs from two such circulators.

Binary One: To send a binary one, data source 310 may be assumed to provide Pockels cells PC1 and PC2 an "on" command for a time of duration necessary to send a binary one message.

In the binary one case, a first-channel photon reaching optical circulator OC1 will be vertically polarized after passing through Pockels cell PC1. Thus, for instances when such vertically-polarized photons are incident with optical circulator OC1, the half-wave plate HWP will cause a 180 degree phase shift, which will not be so provided by the complementary second optical circulator OC2. Again assuming that the reflectance R2 and internal path length D2 for the receiver's optical circulator OC2 are the same for optical circulator OC1, then the optical circulators OC1 and OC2 may operate anti-symmetrically, i.e. each photon of a photon pair tends to never do the same thing. Therefore, due to "two-photon" interference between each of a first-channel photon and second-channel photon of a photon pair, whatever happens to a first-channel photon at OC1, the same thing will not happen to the respective second-channel photon at OC2. The quantum mechanical calculations proving this are presented in FIG. 6.

Thus, in the "on" state, any time delay of a first-channel photon caused by optical circulator OC1 will not be identical to the delay of a second-channel photon caused by optical circulator OC2. For example, again assuming that internal path lengths D1 and D2 are one-foot, then the time difference between first-channel and second-channel photons will be at least one nanosecond and may be greater than one nanosecond, in nanosecond intervals.

Accordingly, should a particular coincidence time window be less than the time it takes for a photon to circulate about optical circulators OC1 and OC2, e.g., 0.8 nanoseconds, then the disparate delay will be reflected at detectors D1 and D2 of receiver 140, and analyzed by coincidence circuitry 410 to reflect photons received outside the coincidence time window. Thus during the time duration of a binary one, few if any coincidence counts will be registered by the coincidence circuitry. In response, the appropriate data bit may be transferred to the data sink 420 where the stream of data provided at the transmitter 130 may be recreated.

Note that with respect to the photons that travel through the communications channel (channel 1) between the Source/

Receiver and the Transmitter, there is no physical difference of any kind between the photons in the binary zero case and the photons in the binary one case (same polarization, time statistics, etc.). The only way to determine whether a binary zero or a binary one is sent from Transmitter to Receiver is to compare the arrival times of the photons of each down-converted pair at detectors D1 and D2 in the Receiver. Since the channel 2 photon of each pair never leaves the Source/Receiver location, only the operator at the Receiver can determine whether a binary zero or a binary one was sent from the Transmitter. Thus the security of the transmitted data is guaranteed due to the physical mechanism of transmission, regardless of whether or not the data is encrypted during transmission.

Figure 7:
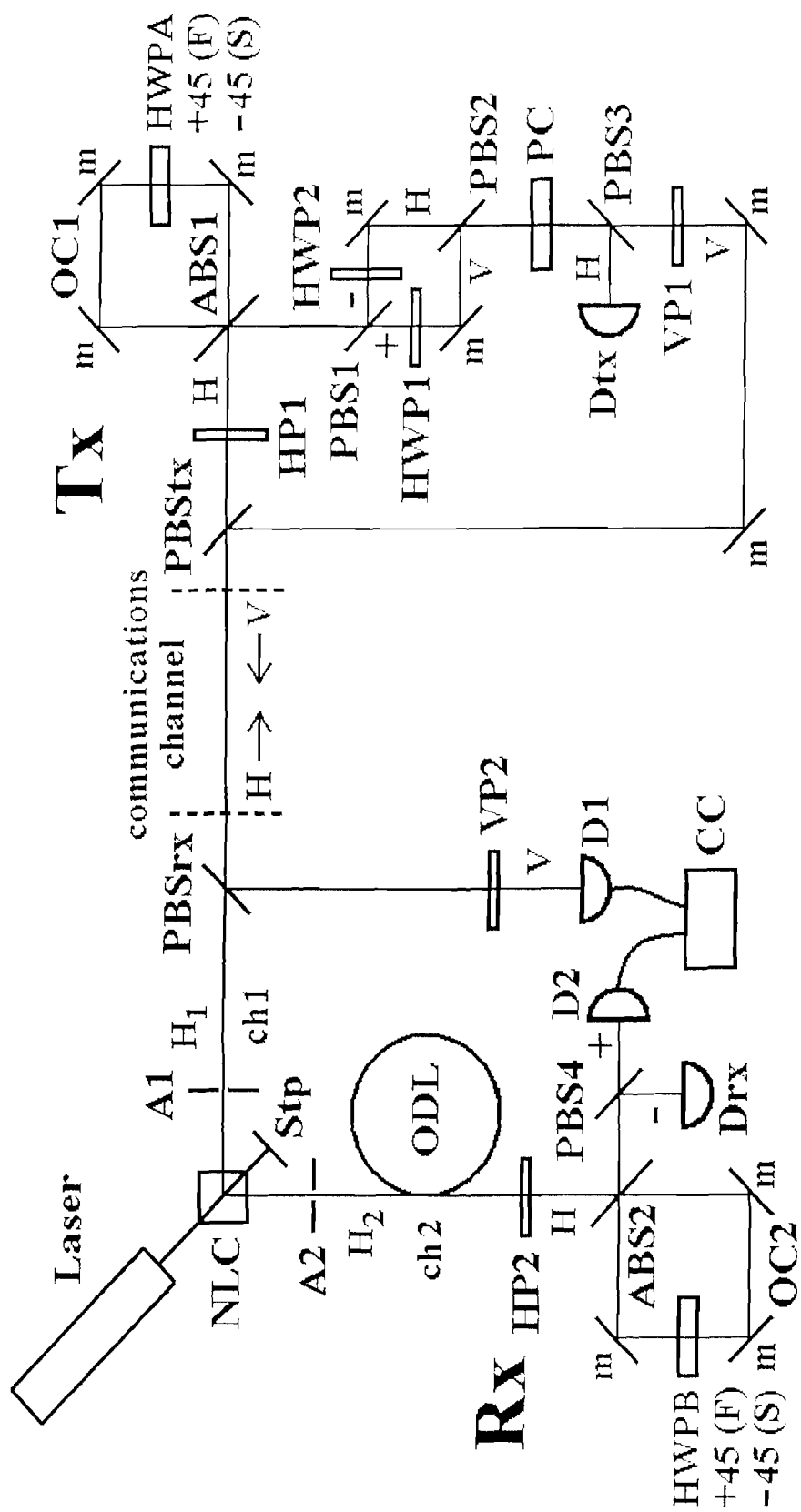
FIG. 7 depicts an alternate design of the system.

One alternate embodiment is shown in FIG. 7. This embodiment causes the outputs from optical circulator OC1 and optical circulator OC2 to be analyzed in the +45 degree/-45 degree polarization basis, rather than the vertical/horizontal polarization basis. Advantages of the system design shown in FIG. 7 are that no phase control device is required in the Transmitter (Tx), and only one Pockels cell (PC) is needed in the Transmitter. A disadvantage of this design is that, on average, only one of every four down-converted photon pairs can be used to transmit information from the Transmitter to the Receiver (Rx).

In this alternate embodiment, half-wave plate HWPA may be placed in the circulation path inside optical circulator OC1 in the Transmitter. Half-wave plate HWPA can be set with its fast axis at +45 degrees from horizontal and its slow axis at -45 degrees from horizontal. Half-wave plate HWPB may be placed in the circulation path inside optical circulator OC2 in the Receiver. Half-wave plate HWPB can be set with its fast axis at +45 degrees from horizontal and its slow axis at -45 degrees from horizontal. Also shown in FIG. 7 are: mirrors (m), first and second horizontal polarizers (HP1 and HP2 respectively), first and second vertical polarizers (VP1 and VP2 respectively), first and second amplitude beam splitters (ABS1 and ABS2 respectively), transmitting and receiving polarizing beam splitters (PBStx and PBSrx), first and second apertures (A1 and A2), first and second channels (ch1 and ch2), horizontally polarized channel 1 and channel 2 photons ($H_1$ and $H_2$ respectively), and an optical delay line (ODL).

In this alternate design, if both photons of a pair have the same polarization (e.g. both are +45 degree polarized, or both are -45 degree polarized) when they are analyzed after they exit from optical circulator OC1 in the Transmitter and optical circulator OC2 in the Receiver, then due to the "two-photon" interference between each of a first-channel photon and second-channel photon of a photon pair, whatever happened to the first-channel photon at OC1, the same thing happened to the respective second-channel photon at OC2. If the photons of a pair have different polarizations (e.g. one is +45 degree polarized, and the other is -45 degree polarized) when they are analyzed after they exit from OC1 and OC2, then due to the "two-photon" interference between each of a first-channel photon and second-channel photon of a photon pair, whatever happened to the first-channel photon at OC1, something different happened to the respective second-channel photon at OC2.

Polarizing beam splitter PBS1 in the Transmitter is set to transmit incident +45 degree polarized photons and to reflect incident -45 degree polarized photons. Half-wave plate HWP1 is oriented so that it rotates the polarization direction of incident +45 degree polarized photons, so that the photons exit from HWP1 vertically (V) polarized. Half-wave plate HWP2 is oriented so that it rotates the polarization direction of incident -45 degree polarized photons, so that the photons exit from HWP2 horizontally (H) polarized. Polarizing beam splitter PBS2 can be set to transmit incident horizontally-polarized photons and to reflect incident vertically-polarized photons. The rotation of +45 degree polarized photons to vertically-polarized, and -45 degree polarized photons to horizontally-polarized allows Pockels cell PC in the Transmitter to be placed in its normal orientation.

Pockels cell PC acts as a switching device modulating a stream of data in response to commands from the data source. Pockels cell PC has at least two states with a first "on" state causing incident photons to change their polarization direction by $\pi/2$ radians when passing through the Pockels cell, while the second "off" state allows photons to pass through with no change in their polarization direction.

Polarizing beam splitter PBS3 in the Transmitter is set to transmit incident vertically (V) polarized photons and to reflect incident horizontally (H) polarized photons to detector Dtx in the Transmitter. Polarizing beam splitter PBS4 in the Receiver is set to transmit incident +45 degree polarized photons to detector D2 and to reflect incident -45 degree polarized photons to detector Drx in the Receiver.

To send a binary zero from the Transmitter to the Receiver, an "off" command is provided to the Pockels cell PC in the Transmitter for a time of duration necessary to send a binary zero message. In the binary zero case, only photons that are +45 degree polarized at the output from optical circulator OC1 are allowed to exit from the Transmitter (as vertically-polarized photons) and travel to detector D1 in the Receiver.

In the binary zero case, on average, for one out of every four down-converted pairs, one photon of the pair will reach detector D1, and the other photon will reach detector D2 in the Receiver. When this happens, in the binary zero case, both photons will arrive within the same coincidence time window. Thus, during the time duration of a binary zero, a significant number of coincidence counts will be registered by the coincidence circuitry CC in the Receiver.

To send a binary one from the Transmitter to the Receiver, an "on" command is provided to the Pockels cell PC in the Transmitter for a time of duration necessary to send a binary one message. In the binary one case, only photons that are -45 degree polarized at the output from optical circulator OC1 are allowed to exit from the Transmitter (as vertically-polarized photons) and travel to detector D1 in the Receiver.

In the binary one case, on average, for one out of every four down-converted pairs, one photon of the pair will reach detector D1, and the other photon will reach detector D2 in the Receiver. When this happens, in the binary one case, the photons will not arrive within the same coincidence time window. Thus, during the time duration of a binary one, few if any coincidence counts will be registered by the coincidence circuitry CC in the Receiver.

The security of all transmitted data is guaranteed due to the physical mechanism of transmission, regardless of whether or not the data is encrypted during transmission.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A secure optical communication system, comprising:
a photon-pair generation circuit configured to generate pairs of photons with each photon pair including a first-channel photon and a second-channel photon;
a transmitting circuit configured to receive first-channel photons, and modulate the first-channel photons according to a stream of data using a first optical circulator to produce first-modulated photons, wherein the first optical circulator includes a first beam splitter having a first reflection coefficient R1 plus a plurality of mirrors to form a first internal path having a length of distance D1, and wherein the first optical circulator further includes a circulator half-wave plate inserted within the first internal path, the circulator half-wave plate allowing photons having a first polarity to pass through with 0 degree phase shift while photons having a second polarity to pass through with 180 degree phase shift; and
a receiving circuit configured to receive second-channel photons, pass the second-channel photons through a complementary optical circulator to produce second second-processed photons, and detect relative timing between the first-modulated photons and the second-processed photons to recover the stream of data.

2. The secure optical communication system of claim 1, further comprising a photon delay circuit between the photon-pair generation circuit and the receiving circuit configured to provide a time delay for at least one of the second-channel photons and the second-processed photons.

3. The secure optical communication system of claim 1, wherein the photon-pair generation circuit includes a light energy source coupled to a non-linear crystal such that photons provided by the light energy source are annihilated to create the photon pairs.

4. The secure optical communication system of claim 3, wherein each photon of the photon pairs has approximately the same center wavelength and bandwidth.

5. The secure optical communication system of claim 1, wherein the transmitting circuit further includes a first switching device between the photon-pair generation circuit and the first optical circulator, the first switching device modulating the stream of data in response to commands from a data source and having at least two states with a first state causing first-channel photons to change polarization when passing through, and a second state allowing first-channel photons to pass through substantially unaffected;
wherein when the first switching device is in the second state, the first optical circulator and the complementary optical circulator operate symmetrically; and
wherein when the first switching device is in the first state, the first optical circulator and the complementary optical circulator operate anti-symmetrically.

6. The secure optical communication system of claim 5, wherein the complementary optical circulator of the receiving circuit has no internal half-wave plate, and wherein the complementary optical circulator includes a beam splitter having a reflection coefficient R2 plus a plurality of mirrors to form an internal path having a length of distance D2.

7. The secure optical communication system of claim 1, wherein the transmitting circuit further includes a first switching device between the photon-pair generation circuit and the first optical circulator, the first switching device modulating the stream of data in response to commands from a data source and having at least two states including a first state and a second state.

8. The secure optical communication system of claim 7, wherein when the first switching device is in the second state, the first optical circulator and the complementary optical circulator operate symmetrically.

9. The secure optical communication system of claim 8, wherein when the first switching device is in the first state, the first optical circulator and the complementary optical circulator operate anti-symmetrically.

10. The secure optical communication system of claim 7, wherein the transmitting circuit further includes a random phase-shifting device located between an output of the first optical circulator and the receiving circuitry.

11. The secure optical communication system of claim 7, wherein the transmitting circuit further includes a first horizontal polarizer located between the first switching device and the photon-pair generation circuit, and a second horizontal polarizer located between the first optical circulator device and the receiving circuit.

12. The secure optical communication system of claim 11, wherein the receiving circuit further includes a third horizontal polarizer located between a complementary optical circulator and the photon-pair generation circuit, and a fourth horizontal polarizer located between the first optical circulator device and a first optical detector of the receiving circuit.

13. The secure optical communication system of claim 7, wherein the receiving circuit further includes a coincidence circuit configured to determine relative timing of first-modulated photons and respective second-processed photons such that when first-modulated photons and respective second-processed photons are received with a first relative timing, the coincidence circuit produces a first output state; and when first-channel photons and respective second-channel photons are received with a second relative timing the coincidence circuit produces a second output state.

14. A secure optical communication system, comprising:
a photon-pair generation means for generating pairs of photons with each photon pair including a first-channel photon and a second-channel photon;
a transmitting means for modulating first-channel photons according to a stream of data to produce first-modulated photons, wherein the first transmitting means includes a first beam splitter having a first reflection coefficient R1 plus a plurality of mirrors to form a first internal path having a length of distance D1, and wherein the first optical circulator further includes a circulator half-wave plate inserted within the first internal path, the circulator half-wave plate allowing photons having a first polarity to pass through with 0 degree phase shift while photons having a second polarity to pass through with 180 degree phase shift; and
a receiving means for processing second-channel photons to produce second-processed photons, and detecting relative timing between the first-modulated photons and the second-processed photons to recover the stream of data.

15. The secure optical communication system of claim 14, wherein the transmitting means includes a first optical circulation means.

16. The secure optical communication system of claim 15, wherein the first optical circulation means includes an internal filtering means for allowing photons having a first polarity to pass through unaffected while altering photons having a second polarity.

17. The secure optical communication system of claim 15, wherein the transmitting means further includes a first switching means located between the photon-pair generation means and the first optical circulation means, the first switching means modulating the stream of data in response to commands from a data source and having at least two states with a first state causing first-channel photons to change polarization when passing through, and a second state allowing first-channel photons to pass through substantially unaffected;

wherein when the first switching means is in the second state, the first optical circulation means and a complementary optical circulation means operate symmetrically; and wherein when the first switching means device is in the first state, the first optical circulation means and the complementary optical circulation means operate anti-symmetrically.

18. The secure optical communication system of claim 17, wherein when the first switching means is in the second state, each second-channel photon of a particular photon pair circulates within the complementary circulation means with the same number of cycles as each respective first-channel photon circulates within the first optical circulation means; and wherein when the first switching means is in the first state, each second-channel photon of a particular photon pair never interacts with the complementary circulation means with the same number of cycles as each respective first-channel photon interacts with the first optical circulation means.

\* \* \* \* \*